United States Patent
Shibata et al.

(10) Patent No.: US 12,031,575 B2
(45) Date of Patent: Jul. 9, 2024

(54) STRUT BEARING DEVICE, AND VEHICLE STRUT SUSPENSION

(71) Applicant: NAKANISHI METAL WORKS CO., LTD., Osaka (JP)

(72) Inventors: Kohei Shibata, Osaka (JP); Yasuhiro Narazaki, Osaka (JP); Shogo Fukada, Osaka (JP)

(73) Assignee: NAKANISHI METAL WORKS CO., LTD., Osaka (JP)

( * ) Notice: Subject to any disclaimer, the term of this patent is extended or adjusted under 35 U.S.C. 154(b) by 0 days.

(21) Appl. No.: 17/937,904

(22) Filed: Oct. 4, 2022

(65) Prior Publication Data

US 2023/0128517 A1 Apr. 27, 2023

(30) Foreign Application Priority Data

Oct. 22, 2021 (JP) ................................ 2021-172904

(51) Int. Cl.
*B60G 15/06* (2006.01)
*F16C 19/10* (2006.01)

(52) U.S. Cl.
CPC ............. *F16C 19/10* (2013.01); *B60G 15/068* (2013.01); *B60G 2204/418* (2013.01); *F16C 2326/05* (2013.01)

(58) Field of Classification Search
CPC ............. B60G 15/068; B60G 2204/128; B60G 2204/418; F16C 19/10; F16C 33/761;
(Continued)

(56) References Cited

U.S. PATENT DOCUMENTS 6,814,496 B2 11/2004 Beghini et al.
8,496,383 B2 7/2013 Viault et al.
(Continued)

FOREIGN PATENT DOCUMENTS

BR 112013030402 B1 * 6/2021 ............ F16C 17/04
CN 107165943 B * 5/2019 ............ F16C 17/10
(Continued)

OTHER PUBLICATIONS

Description Translation for KR 2016/0059092 from Espacenet (Year: 2016).*
(Continued)

*Primary Examiner* — Jason D Shanske
*Assistant Examiner* — Daniel M. Keck
(74) *Attorney, Agent, or Firm* — INNOVATION CAPITAL LAW GROUP, LLP; Vic Lin (57) ABSTRACT

In a strut bearing device, an upper spring seat made of steel has a cylindrical part and a disc part. The cylindrical part has, at an upper part thereof, an engagement hole penetrated in a radial direction. A lower case of a strut bearing has a cylindrical member fitted along an inner peripheral surface of the upper part of the cylindrical part. The cylindrical member has, at its outer peripheral surface, an engagement projection that is engaged with an engagement hole. Relative movement of the upper spring seat and the lower case in an axial direction and in a circumferential direction is restricted in a state where the engagement projection is engaged with the engagement hole.

4 Claims, 10 Drawing Sheets

(58) Field of Classification Search
CPC .. F16C 35/06; F16C 2208/04; F16C 2208/60; F16C 2226/62; F16C 2240/44; F16C 2326/05
See application file for complete search history.

(56) References Cited

U.S. PATENT DOCUMENTS

2010/0014792 A1   1/2010   Kellam
2022/0389969 A1*  12/2022  Barthelme .............. F16C 39/02

FOREIGN PATENT DOCUMENTS

| | | | | |
|---|---|---|---|---|
| JP | 2016128722 A * | 7/2016 | ............. | F16C 17/04 |
| JP | 6631648 B2 * | 1/2020 | ............. | B60G 15/06 |
| KR | 20160059092 A | 5/2016 | | |
| KR | 20170004772 A * | 1/2017 | | |
| WO | WO-2014119281 A1 * | 8/2014 | ........... | B60G 15/068 |

OTHER PUBLICATIONS

Extended European Search Report dated Feb. 27, 2023 from European Application No. 22202360.8.

* cited by examiner

STRUT BEARING DEVICE, AND VEHICLE STRUT SUSPENSION

BACKGROUND OF THE INVENTION

Field of the Invention

The present invention relates to a strut bearing device for use in a vehicle strut suspension.

Description of the Background Art

As a suspension that supports a wheel on the body of a vehicle by means of a coil spring and includes a shock absorber for absorbing vertical vibrations, there is a strut suspension in which an extendable strut containing a shock absorber is fixed to an axle. The strut suspension is widely used, mainly, for a front wheel of an automobile.

As a strut bearing device used in an upper portion of the strut suspension, there is a strut bearing device for supporting, in an axial direction, a spring support component (e.g., a bottom retainer 7 of Patent Literature (PTL) 1 and a bottom cup 16 of PTL 2) for supporting an upper end of a coil spring (e.g., a coil spring 2 of PTL 1 and a coil spring 17 of PTL 2), and a lower case that is included in a strut bearing and is made of a synthetic resin (e.g., a bottom cover 5 of PTL 1 and a bottom cap 15 of PTL 2) (see PTLS 1 and 2, for example).

In PTL 1, the spring support component and the lower case are held in the axial direction by friction generated by an elastically deformed resin component that is elastically deformed so as to be in contact with a metal component. Specifically, a tongue piece 15 provided in an axially inner surface 11c of a body 11 that is included in a bottom cover 5 and is made of a synthetic resin, comes into contact with an inner peripheral surface of an axial portion 17a of a strut 17 that is included in the bottom retainer 7 and is made of steel (FIGS. 1 and 2). Alternatively, a lug 20 provided in the inner peripheral surface of the axial portion 17a comes into contact with the axially inner surface 11c of the body 11 (FIGS. 3 and 4).

In PTL 2, the spring support component and the lower case are held in the axial direction by providing a plurality of hooks 15f extending downward in the axial direction in the bottom cap 15 made of a synthetic resin. Specifically, an end portion 15g of each of the hooks 15f interferes with a small-diameter free end of a radial portion 16c of the bottom cup 16 made of steel, to thereby fasten the bottom cap 15 and the bottom cup 16 in the axial direction (FIGS. 1-2, and FIGS. 5-6).

CITATION LIST

Patent Literature

"PTL 1" refers to U.S. Pat. No. 8,496,383.
"PTL 2" refers to U.S. Pat. No. 6,814,496.

SUMMARY OF INVENTION

Technical Problem

PTL 1 discloses a method of holding the spring support component and the lower case in the axial direction. In the method, a tightening strength between the bottom retainer 7 and the bottom cover 5 is lowered due to aging deterioration (creep) of a resin component. This may cause a separation-preventing ability of the bottom retainer 7 and the bottom cover 5 to be lowered or to be lost.

PTL 2 discloses a method of holding the spring support component and the lower case in the axial direction. In the method, relative movement of the bottom cap 15 and the bottom cup 16 in the circumferential direction is not restricted, so that the bottom cap 15 and the bottom cup 16 slide in the circumferential direction. This causes a contact surface, with the bottom cup 16 made of steel, in the bottom cap 15 made of a synthetic resin, to be worn away.

A purpose of the present invention is to provide a strut bearing device that can hold a spring support component and a lower case in the axial direction, without fail. Another purpose of the present invention is to provide a strut bearing device in which a contact surface, with the spring support component made of steel, in the lower case made of a synthetic resin is not worn away.

Solution to Problem

In order to solve the problems described above, a strut bearing device according to the present invention includes a strut bearing; and an upper spring seat that is a spring support component supporting an upper end of a coil spring, in which the strut bearing includes: an upper case and a lower case; an upper raceway ring held by the upper case; a lower raceway ring held by the lower case; and a rolling element that rolls between the upper raceway ring and the lower raceway ring, the upper case and the lower case are made of a synthetic resin, the upper spring seat is made of steel, the upper spring seat has a cylindrical part and a disc part, the cylindrical part has, at an upper part thereof, one of an engagement hole penetrated in a radial direction and an engagement recess having a hollowed inner peripheral surface, the lower case has a cylindrical member fitted along an inner peripheral surface of the upper part of the cylindrical part, the cylindrical member has, at an outer peripheral surface thereof, an engagement projection engaged with the engagement hole or the engagement recess, and relative movement of the upper spring seat and the lower case in an axial direction and in a circumferential direction is restricted in a state where the engagement projection is engaged with the engagement hole or the engagement recess.

According to such a configuration of the strut bearing device of the present invention, the engagement projection of the cylindrical member in the lower case is engaged with the engagement hole or the engagement recess, of the cylindrical part in the upper spring seat. With this configuration, the relative movement of the upper spring seat and the lower case in the axial direction is restricted. Therefore, the upper spring seat that is a spring support component and the lower case are prevented from being separated in the axial direction, so as to be surely held in the axial direction.

According to the configuration of the strut bearing device of the present invention, the engagement projection of the cylindrical member in the lower case is engaged with the engagement hole or the engagement recess of the cylindrical part in the upper spring seat. With this configuration, the relative movement of the upper spring seat and the lower case in the circumferential direction is restricted. Thus, the lower case can be positioned relative to the upper spring seat in the circumferential direction, thereby preventing the upper spring seat and the lower case from sliding in the circumferential direction. Therefore, the contact face, with the upper spring seat made of steel, in the lower case made of the synthetic resin is not worn away.

Here, it is preferable that the engagement projection of the lower case has a top face that is a substantially horizontal surface or a side face of a column extending in a substantially horizontal direction, and the engagement projection has a bottom face that is an inclined face reducing a diameter thereof as approaching a lower side.

According to such a configuration of the strut bearing device of the present invention, the inclined surface of the bottom face of the engaged projection in the lower case made of a synthetic resin is fitted along from the upper part of the inner peripheral surface of the cylindrical part of the upper spring seat made of steel so as to allow the lower case to be elastically deformed and easily fall downward relative to the upper spring seat. Therefore, the engagement projection of the lower case can be easily engaged with the engagement hole or the engagement recess, of the upper spring seat.

In addition, the top face of the engagement projection is stopped at an upper wall of the engagement hole or the engagement recess, in a state where the engagement projection is engaged in the engagement hole or the engagement recess. The top face is a substantially horizontal surface or a side face of a column extending in a substantially horizontal direction. Therefore, separation between the upper spring seat that is a spring support component and the lower case in the axial direction can be surely prevented.

In order to solve the above-described problem, a strut bearing device according to the present invention includes a strut bearing; and an upper spring seat that is a spring support component supporting an upper end of a coil spring, in which the strut bearing includes: an upper case and a lower case; an upper raceway ring held by the upper case; a lower raceway ring held by the lower case; and a rolling element that rolls between the upper raceway ring and the lower raceway ring, the upper case and the lower case are made of a synthetic resin, the upper spring seat is made of steel, the upper spring seat has a cylindrical part and a disc part, and the cylindrical part has, at an upper part thereof, an engagement projection that projects in a radially inward direction, the lower case has a cylindrical member fitted along an inner peripheral surface of the upper part of the cylindrical part, the cylindrical member has one of an engagement hole penetrated in a radial direction and an engagement recess that has a hollowed outer peripheral surface, the engagement hole and the engagement recess being engaged with the engagement projection, and relative movement of the upper spring seat and the lower case in an axial direction and in a circumferential direction is restricted in a state where the engagement hole or the engagement recess is engaged with the engagement projection.

According to such a configuration of the strut bearing device of the present invention, the engagement hole or the engagement recess of the cylindrical member in the lower case is engaged with the engagement projection of the cylindrical part in the upper spring seat, thereby restricting the relative movement of the upper spring seat and the lower case in the axial direction. Therefore, the separation between the upper spring seat that is a spring support component and the lower case in the axial direction can be prevented, so that the upper spring seat and the lower case can be surely held.

According to the configuration of the strut bearing device of the present invention, the engagement hole or the engagement recess of the cylindrical member in the lower case is engaged with the engagement projection of the cylindrical part in the upper spring seat, thereby restricting the relative movement of the upper spring seat and the lower case in the axial direction. Thus, the lower case can be positioned relative to the upper spring seat in the circumferential direction, so that the upper spring seat and the lower case do not slide in the circumferential direction. Therefore, the contact surface with the upper spring seat made of steel, in the lower case made of a synthetic resin, is not worn away.

A vehicle strut suspension according to the present invention includes the strut bearing device.

Advantageous Effects of Invention

As described above, according to the strut bearing device and a vehicle strut suspension of the present invention, the upper spring seat that is a spring support component and the lower case can be surely held in the axial direction, and the contact surface with the upper spring seat made of steel, in the lower case made of a synthetic resin, is not worn away.

DESCRIPTION OF EMBODIMENTS

Hereinafter, embodiments of the present invention are described with reference to the drawings.

In the description, a direction parallel to a rotation axis O (see FIG. 1) of a strut bearing device 1 is referred to as an "axial direction" (see an arrow J in FIG. 1, for example), a direction orthogonal to the rotation axis O is referred to as a "radial direction" (see an arrow R in FIG. 1, for example), and views seen in the radial direction R (FIGS. 4 to 6) are set as front views.

Figure 1:
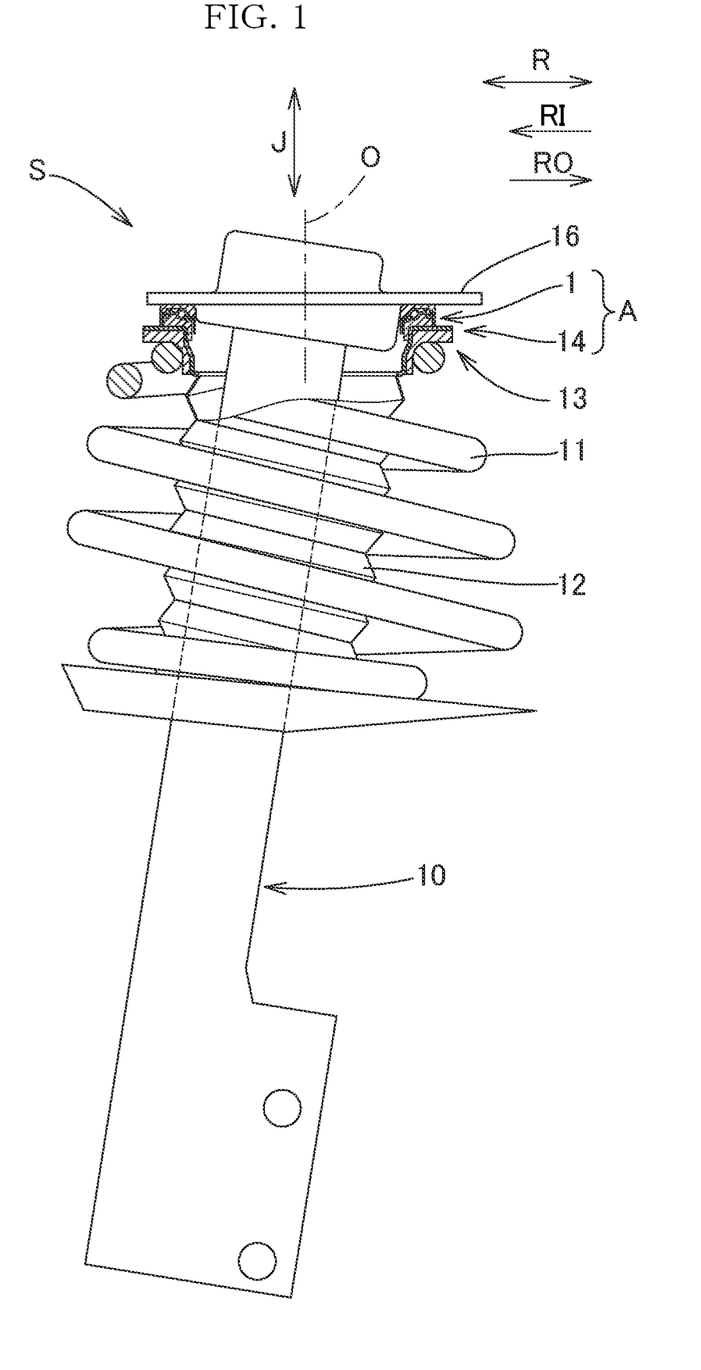
FIG. 1 is a schematic view with a partially cross-sectional view, showing a vehicle strut suspension provided with a strut bearing device according to an embodiment of the present invention.

In the description, a radial direction approaching the rotation axis O is referred to as a "radially inward direction" (see an arrow RI in FIG. 1, for example), and a radial direction going away from the rotation axis O is referred to as a "radially outward direction" (see an arrow RO in FIG. 1, for example). When the rotation axis O is defined as a vertical direction, a horizontal direction that is orthogonal to the radial direction extending from the rotation axis O is referred to as a "circumferential direction" (see an arrow E in FIG. 3, for example).

Strut Suspension

A vehicle strut suspension S shown in the schematic view with the partially cross-sectional view of FIG. 1 is used in a state where an extendable strut 10 containing a shock absorber is fixed to an axle (not shown) and an upper mount 16 is fixed to the body of a vehicle.

The strut suspension S is provided with, at its upper portion, a strut bearing device 1 that is swingably rotated in proportion to a direction change of a steering wheel in accordance with steering operation, while supporting the vehicle body. A swing angle of the strut bearing 1 is defined so as to correspond to an allowable steering angle of a wheel, and is set in a range of 40° or more and 50° or less, for example.

A coil spring 11 serving as a suspension spring, and a dust boot 12 used for protecting an oil seal of the shock absorber from foreign substances such as sand are provided on an outer-diameter side of the strut 10 in the radially outward direction RO. The strut suspension S includes a spring support component 13 that supports an upper end of the coil spring 11. The spring support component 13 includes an upper spring seat 14 and an upper insulator 15, as shown in the vertical cross-sectional view of FIG. 2A.

Strut Bearing Device

Figure 2A:
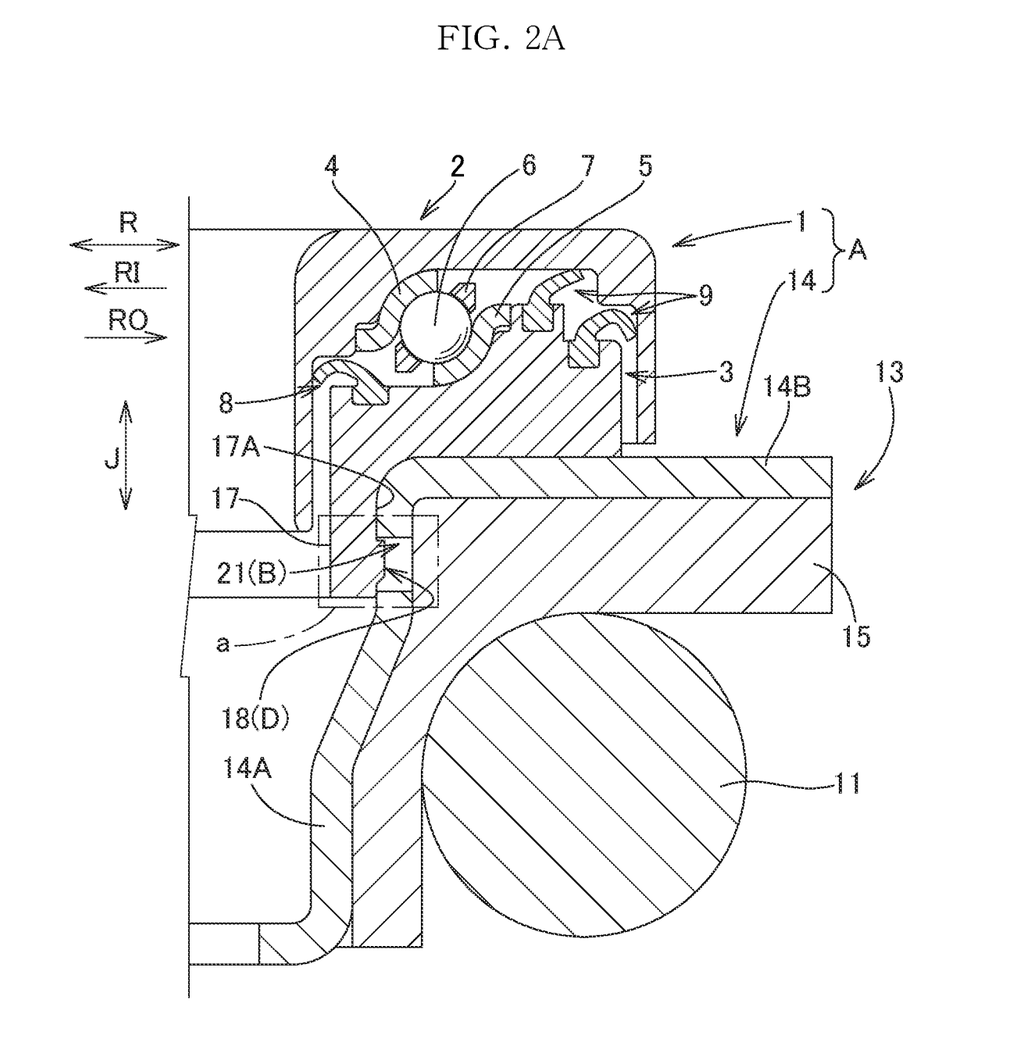
FIG. 2A is an enlarged vertical cross-sectional view of a main part, showing the strut bearing device, an upper insulator, and a coil spring.

As shown in the schematic view of FIG. 1, the vertical cross-sectional view of FIG. 2A, the strut bearing device A includes a strut bearing 1 and an upper spring seat 14 that is a spring support component 13 that supports the upper end of the coil spring 11.

The strut bearing 1 includes an upper case 2, a lower case 3, an upper raceway ring 4, a lower raceway ring 5, rolling elements 6, a retainer 7, an inner-diameter side seal 8, an outer-diameter side seal 9, and so on.

The upper case 2 is fixed to an upper end portion of the strut 10, and the lower case 3 receives the upper spring seat 14 from above. The upper raceway ring 4 is held by the upper case 2, and the lower raceway ring 5 is held by the lower case 3. The rolling elements 6 roll between the upper raceway ring 4 and the lower raceway ring 5, and the retainer 7 holds each of the rolling elements 6 so that the adjacent rolling elements 6 do not come into contact with each other.

The inner-diameter side seal 8 is positioned in a radially inward direction RI relative to the rolling elements 6, and the outer-diameter side seal 9 is positioned in a radially outward direction RO relative to the rolling elements 6.

The upper raceway ring 4, the lower raceway ring 5, and the upper spring seat 14 are made of steel, and are formed in a manner that a steel plate is subjected to press working, and then undergoes quenching to be hardened. The upper case 2 and the lower case 3 are made of a synthetic resin, and the inner-diameter side seal 8 and the outer-diameter side seal 9 are made of elastomer.

The synthetic resin used for the upper case 2 and the lower case 3 is polyamide (PA66, PA46, PA612, PA6, PA9T, PA10T, and so on) and contains 20 to 60% by weight of glass fiber (GF) as reinforced fiber, for example.

The elastomer used for the inner-diameter side seal 8 and the outer-diameter side seal 9 is thermoplastic elastomers (TPE) including TPS (styrene-based elastomer), TPO (olefin-based elastomer), TPU (urethane-based elastomer), TPA (amide-based elastomer), TPEE (ester-based elastomer), and so on. Rubber materials include nitrile rubber (NBR), hydrogenated nitrile rubber (HNBR), acrylic rubber (ACM), ethylene-acrylic rubber (AEM), fluorine rubber (FKM, FPM), silicone rubber (VQM), and so on. One of the rubber materials may be used, or two or more of the rubber materials may be suitably blended and used.

Molding of Upper Case and Lower Case

The upper case 2 and the lower case 3 are molded through injection molding. Specifically, the upper case 2 is molded in a manner that a molten synthetic resin is injected, into a cavity for molding the upper case 2, through a gate of a mold having the cavity. Similarly, the lower case 3 is molded in a manner that the molten synthetic resin is injected, into a cavity for molding the lower case 3, through a gate of a mold having the cavity.

Upper Spring Seat

Figure 2B:
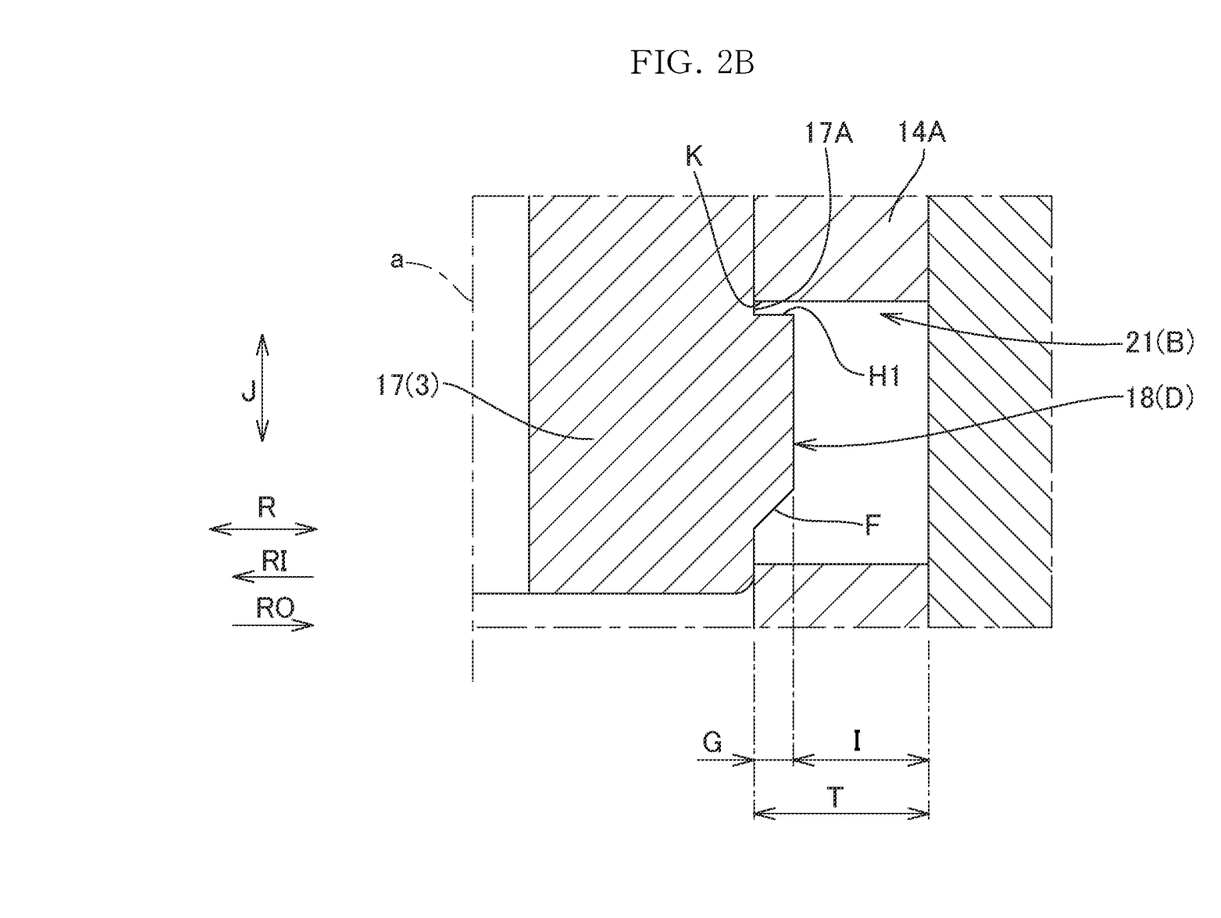
FIG. 2B is an enlarged view of a surrounded portion indicated by "a" in FIG. 2A.
Figure 3:
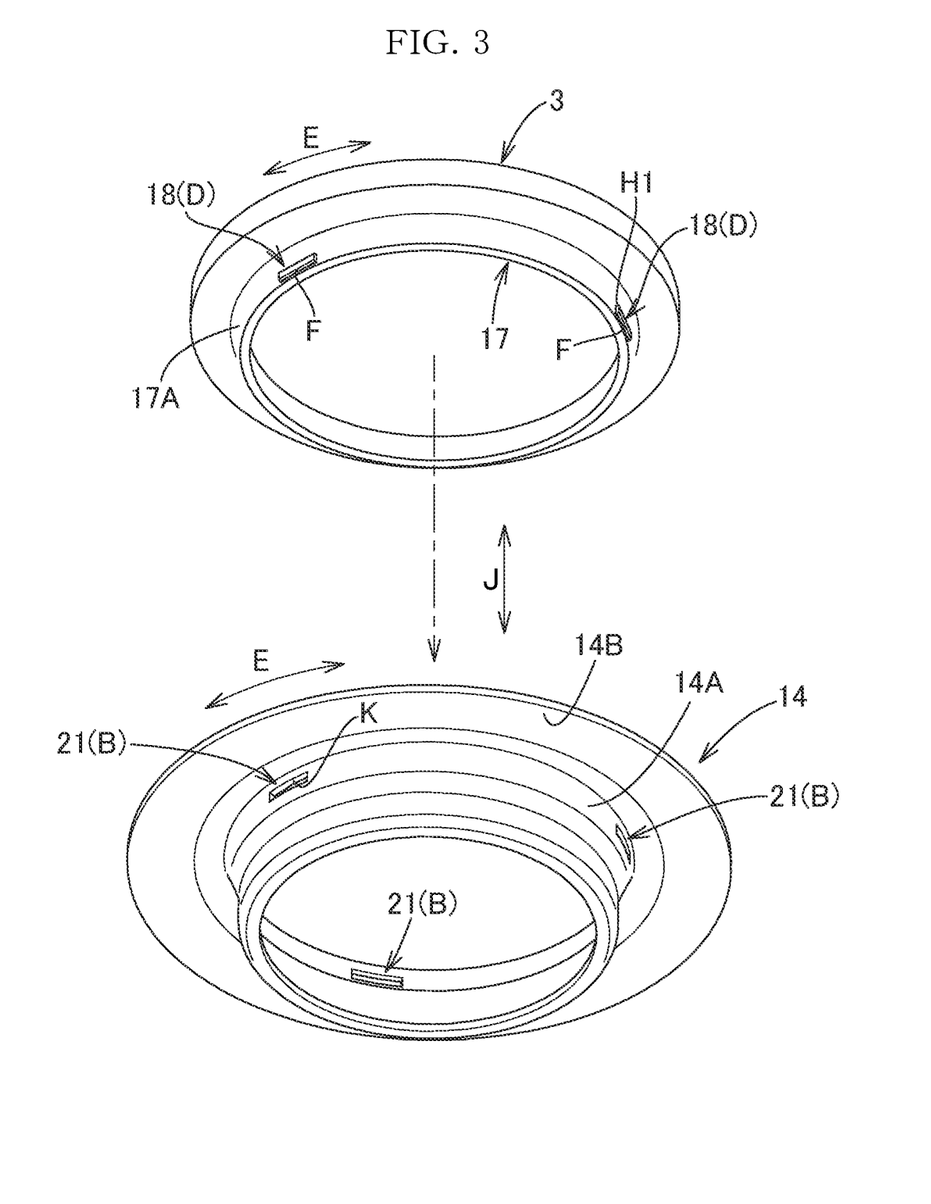
FIG. 3 is a perspective view seen from below, showing a state in which a lower case and an upper spring seat are taken out and separated from each other.
Figure 4:
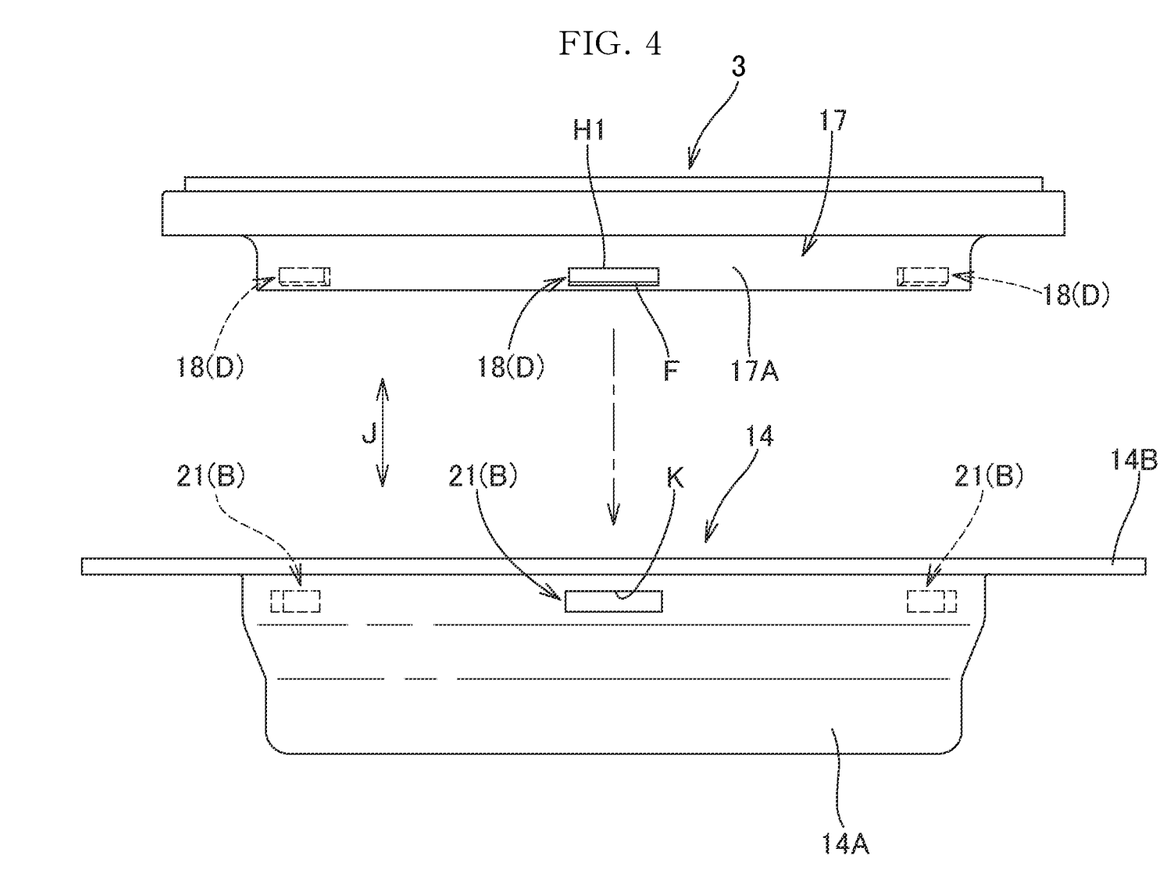
FIG. 4 is a front view showing a state in which the lower case and the upper spring seat are taken out and separated from each other.

As shown in the vertical cross-sectional view of FIG. 2A, FIG. 2B that is the enlarged view of the surrounded portion "a" shown in FIG. 2A, the perspective view of FIG. 3, and the front view of FIG. 4, the upper spring seat 14 has a cylindrical part 14A and a disc part 14B extending in the radially outward direction RO from an upper end portion of the cylindrical part 14A. The cylindrical part 14A has, at an upper part thereof, a square hole 21 that penetrates in a radial direction R to serve as an engagement hole B.

Lower Case

The lower case 3 has a cylindrical member 17 fitted along an inner peripheral surface of the upper part of the cylindrical part 14A of the upper spring seat 14. The cylindrical member 17 has, at its outer peripheral surface 17A, a square-shaped projection piece 18 serving as an engagement projection D that is to engage with the square hole 21 serving as the engagement hole B of the upper spring seat 14.

A top face of the square-shaped projection piece 18 is a substantially horizontal surface H1, and a bottom face of the square-shaped projection piece 18 is an inclined surface F that reduces its diameter as approaching a lower side. As shown in the perspective view of FIG. 3 and the front view of FIG. 4, the upper spring seat 14 and the lower case 3 are brought close to each other, and the inclined surface F in the bottom face of the square-shaped projection piece 18 serving as the engagement projection D in the lower case 3 made of a synthetic resin is fitted along from the upper part of the inner peripheral surface of the cylindrical part 14A of the upper spring seat 14 made of the steel with elastically deforming the lower case 3, thereby easily lowering the lower case 3 down along the upper spring seat 14.

Accordingly, as shown in the vertical cross-sectional views of FIGS. 2A and 2B, the square-shaped projection piece 18 serving as the engagement projection D in the lower case 3 can be easily engaged with the square hole 21 serving as the engagement hole B of the upper spring seat 14. As shown in FIGS. 2A and 2B, relative movement of the upper spring seat 14 and the lower case 3 in the axial direction J is restricted in the state where the square-shaped projection piece 18 is engaged with the square hole 21. In addition, the top face that is the substantially horizontal surface H1 of the square-shaped projection piece 18 is stopped at an upper wall K of the square hole 21. Therefore, separation between the upper spring seat 14 serving as the spring support component 13 and the lower case 3 in the axial direction J can be surely prevented.

As shown in the vertical cross sectional view of FIG. 2B, relationship among: a radial height G that is a projecting height of the square-shaped projection piece 18 serving as the engagement projection D in the radially outward direction RO; a radial distance I from a distal end of the square-shaped projection piece 18 to an outer peripheral surface of the cylindrical part 14A; and a thickness T of the cylindrical part 14A is expressed as G+I=T. When T is 2 mm, for example, the radial height G of the square-shaped projection piece 18 should be around 0.5 to 1.0 mm, for example.

The square-shaped projection piece 18 is engaged with the square hole 21 having a shape shown in the perspective view of FIG. 3 and the front view of FIG. 4, in a state where the square-shaped projection piece 18 of the lower case 3 is engaged with the square hole 21 of the upper spring seat 14 as shown in the vertical cross-sectional views of FIGS. 2A and 2B. Therefore, the relative movement of the upper spring seat 14 and the lower case 3 in the circumferential direction E shown in FIG. 3 is restricted.

An attachment position of the assembly of the strut bearing 1 and the upper spring seat 14 to a vehicle body in the circumferential direction E is fixed. Thus, the lower case 3 of the strut bearing 1 is restricted from moving relative to the upper spring seat 14 in the circumferential direction E, as described above, in the strut bearing device A according to the embodiment of the present invention.

As described above, the lower case 3 can be positioned relative to the upper spring seat 14 in the circumferential direction E, so that the upper spring seat 14 and the lower case 3 do not slide in the circumferential direction E. Therefore, a contact surface, with the upper spring seat 14 made of steel, of the lower case 3 made of a synthetic resin is not worn away.

Modified Example

Figure 5:
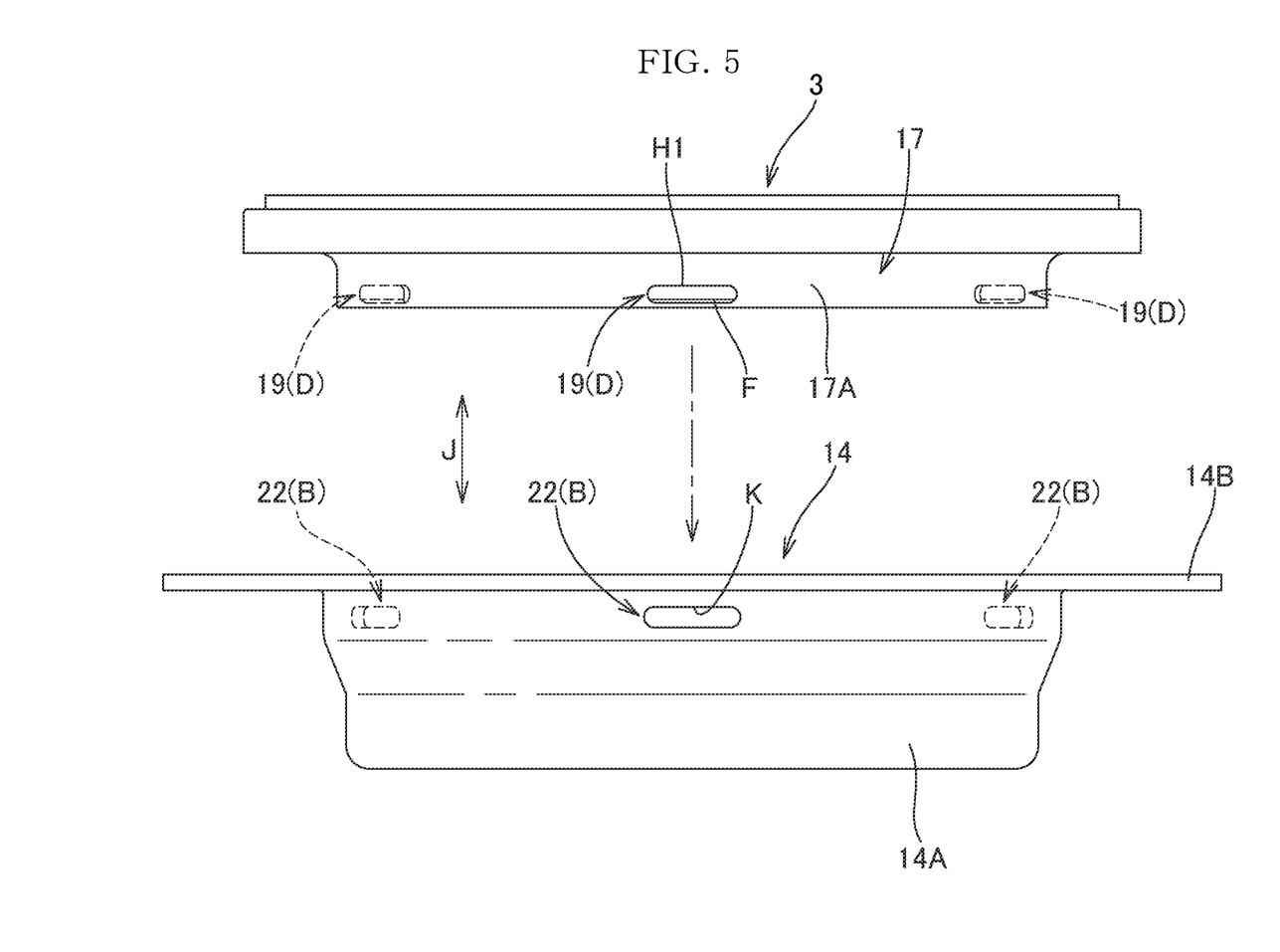
FIG. 5 is a front view, similar to FIG. 4, showing a modified example of an engagement projection and an engagement hole.
Figure 6:
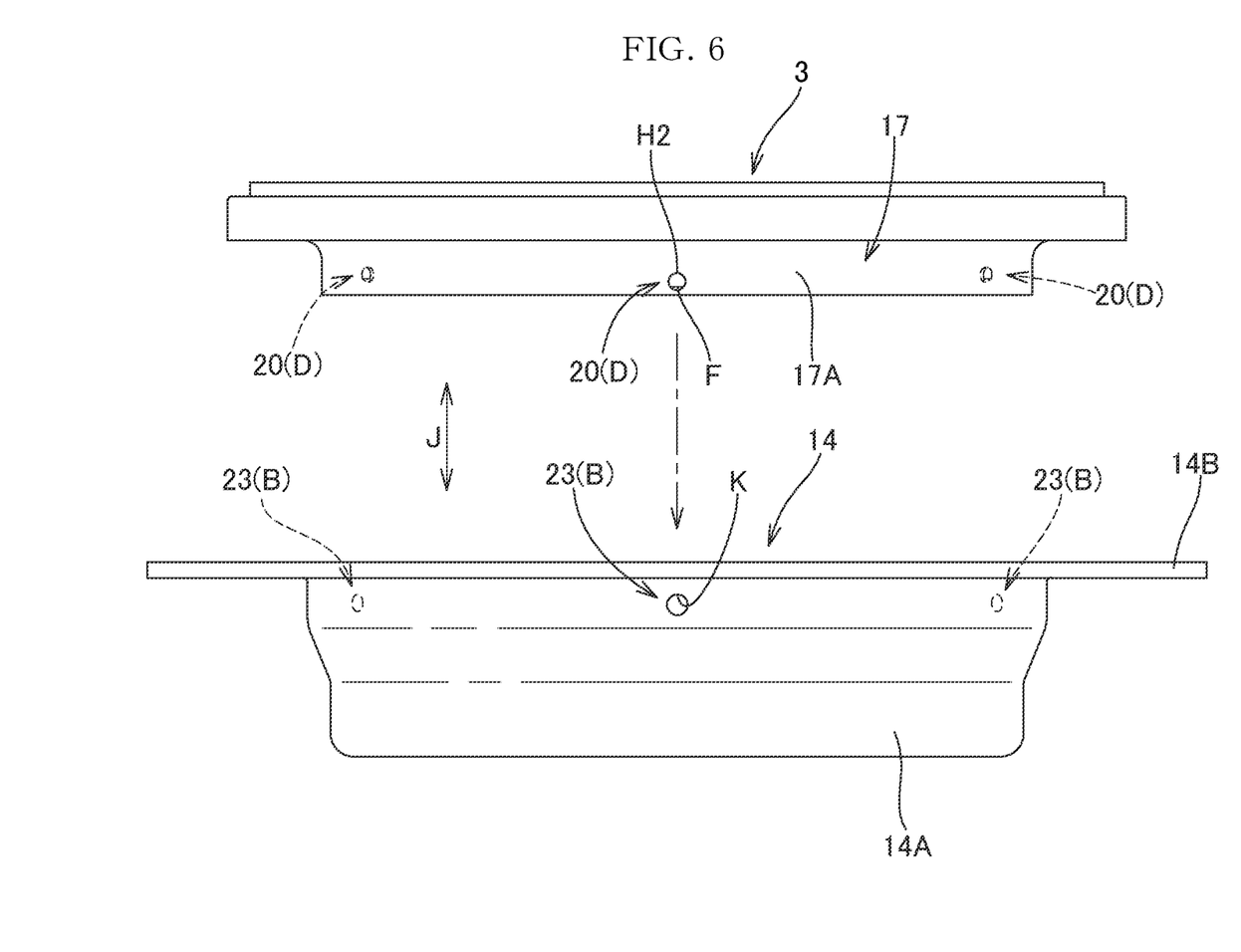
FIG. 6 is a front view, similar to FIG. 4, showing another modified example of the engagement projection and the engagement hole.

The engagement hole B of the upper spring seat 14 and the engagement projection D of the lower case 3 may respectively be a long hole 22 and long-circle shaped projection piece 19 as shown in the front view of FIG. 5, and may respectively be a round hole 23 and a round shaped projection piece 20 as shown in the front view of FIG. 6. The top face of the round shaped projection piece 20 shown in FIG. 6 is not the substantially horizontal surface H1, but a side surface H2 of a column extending in the substantially horizontal direction.

Figure 7A:
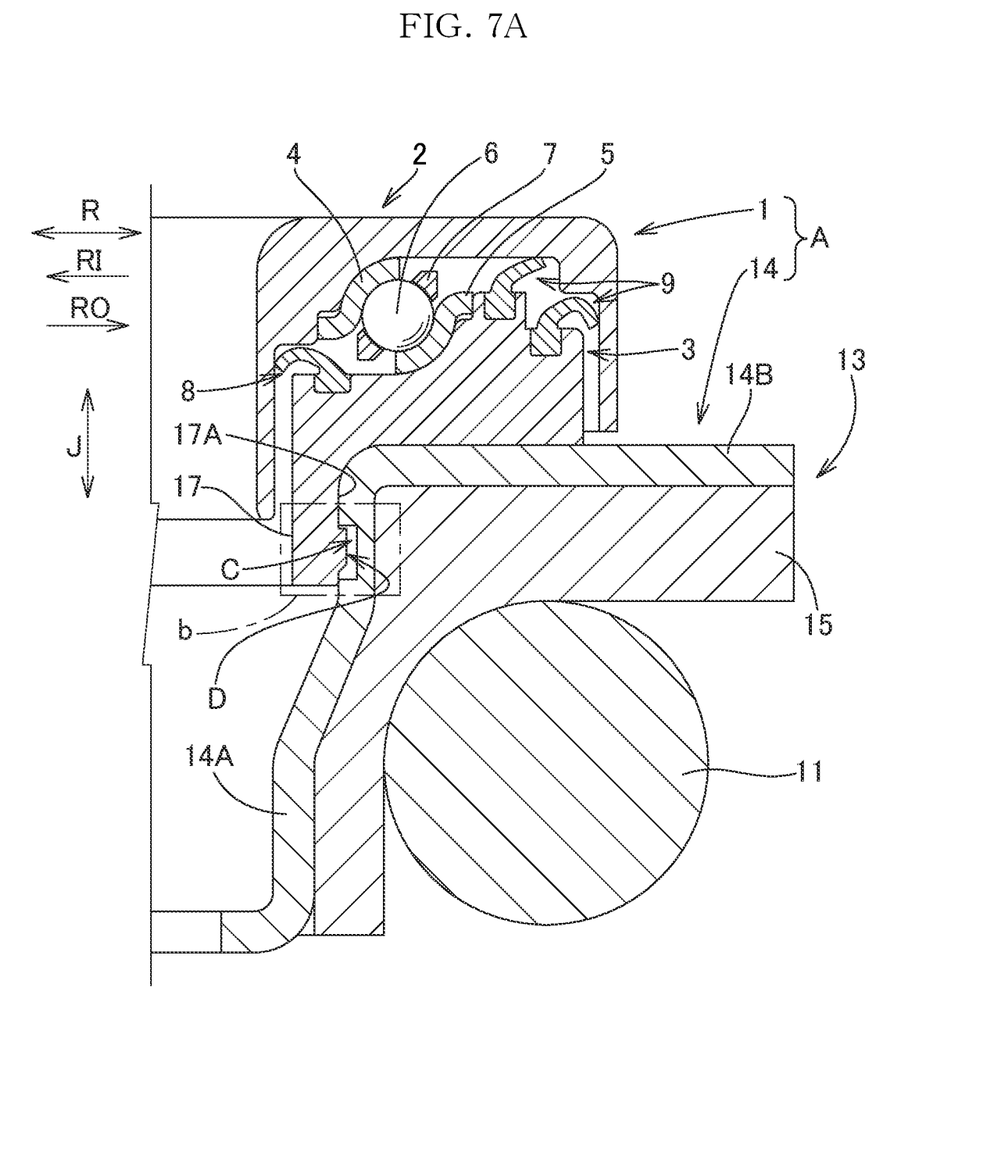
FIG. 7A is an enlarged vertical cross-sectional view of a main part, similar to FIG. 2A, showing an example in which the engagement hole is replaced with an engagement recess.
Figure 7B:
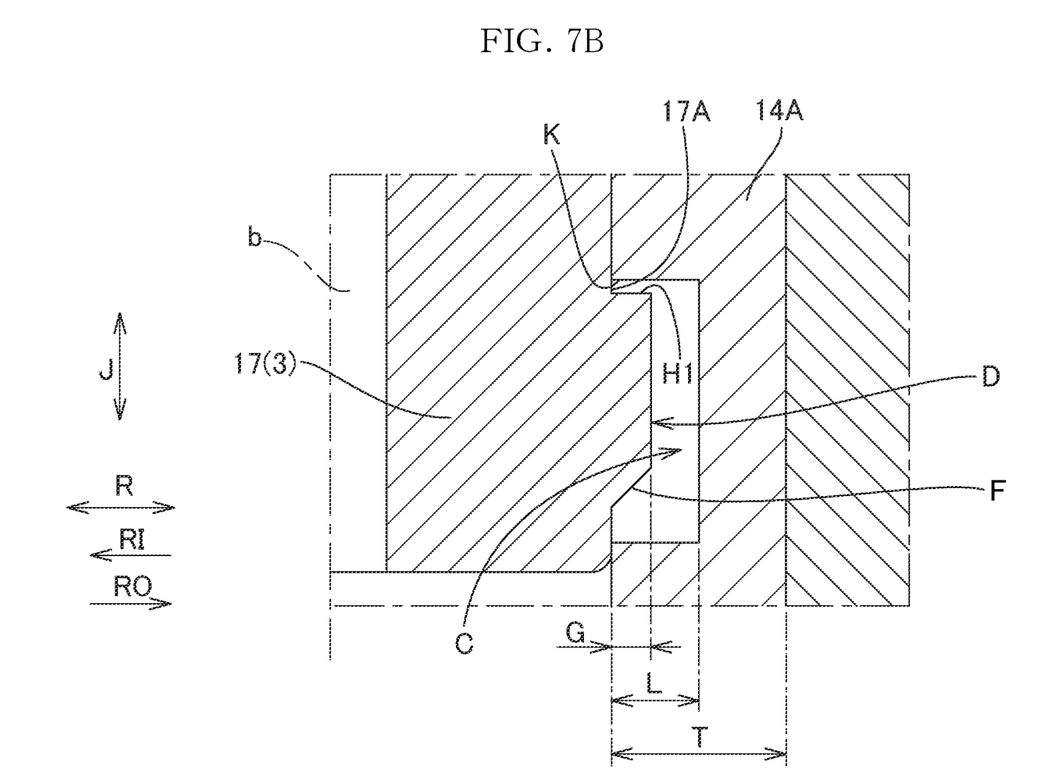
FIG. 7B is an enlarged view of a surrounded portion indicated by "b" in FIG. 7A.

As shown in the enlarged vertical cross-sectional view of a main part in FIG. 7A and FIG. 7B that is the enlarged view of the surrounded portion "b" in FIG. 7A, the cylindrical part 14A of the upper spring seat 14 may have an engagement recess C having a hollowed inner peripheral surface, instead of the engagement hole B. In such a configuration, the relative movement of the upper spring seat 14 and the lower case 3 in the axial direction J and the circumferential direction E is also restricted in a state where the engagement projection D is engaged with the engagement recess C. The reference sign K in FIG. 7B indicates an upper wall of the engagement recess C.

As shown in the vertical cross-sectional view of FIG. 7B, relationship among: the radial height G that is a projecting height of the engagement projection D in the radially outward direction RO; a radial depth L of the engagement recess C; and the thickness T of the cylindrical part 14A is expressed as G<L<T. When T is 2 mm, for example, L should be around 1.0 to 1.5 mm, for example, and G should be less than L, e.g., a level of 0.5 to 1.0 mm. If the outer peripheral surface of the cylindrical part 14A projects in the radially outward direction RO and the projecting part disadvantageously interferes with peripheral components, due to the engagement recess C that is provided in the cylindrical part 14A of the upper spring seat 14, the engagement hole B penetrating in the radial direction R may be used instead of the engagement recess C.

It is merely required that at least a pair of the engagement hole B and the engagement projection D, or a pair of the engagement recess C and the engagement projection D, which are described above, is provided in the circumferential direction.

Figure 8:
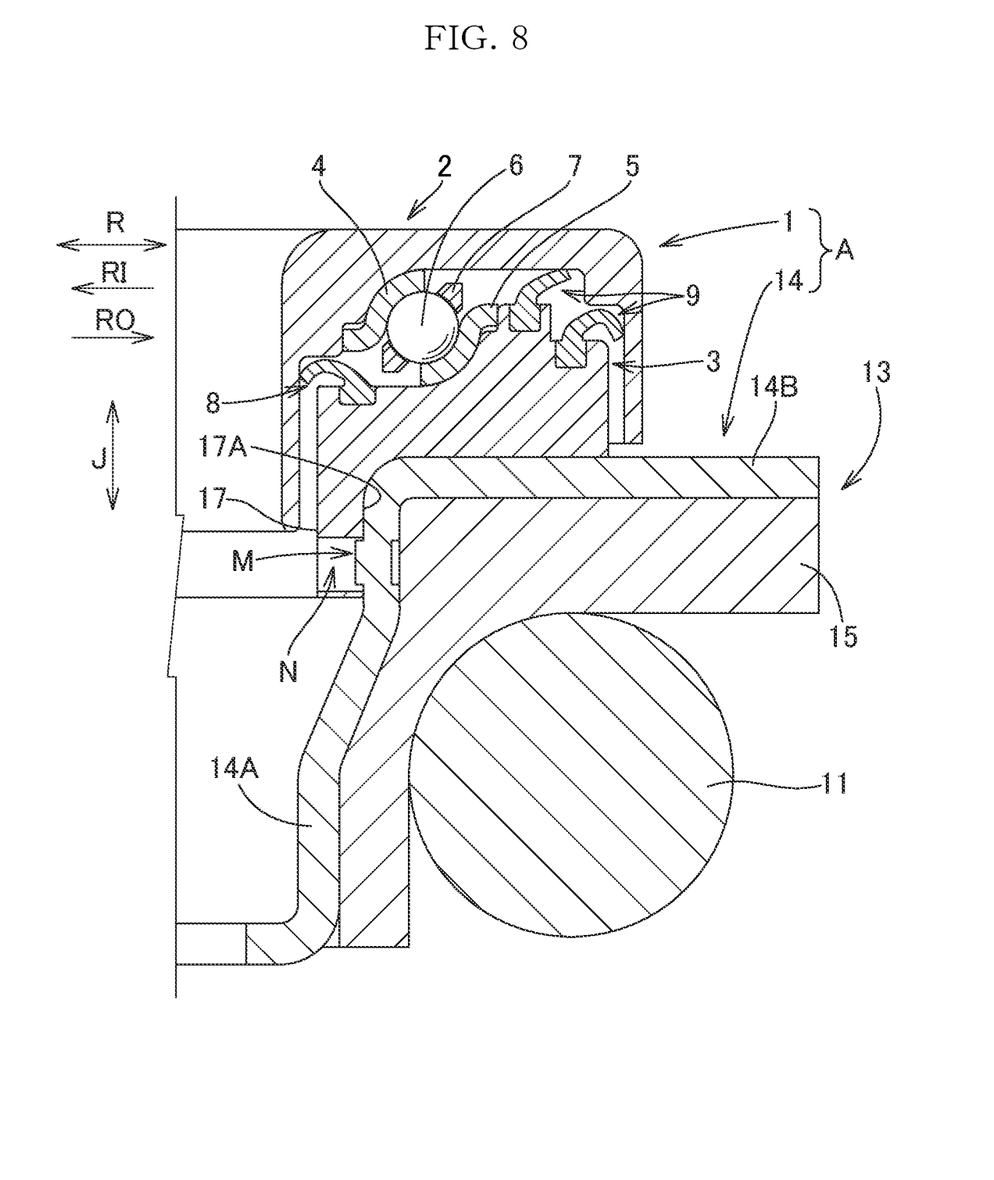
FIG. 8 is an enlarged vertical cross-sectional view of a main part, showing a modified example in which the engagement projection is provided in the upper spring seat, and the engagement hole is provided in the lower case.

As shown in the enlarged vertical cross-sectional view of the main part in FIG. 8, an engagement projection M projecting in the radially inward direction RI may be provided at the upper part of the cylindrical part 14A of the upper spring seat 14, and an engagement hole N that is to engage with the engagement projection M and penetrates in the radial direction R may be provided in the cylindrical member 17 of the lower case 3. Even in such a configuration, the relative movement of the upper spring seat 14 and the lower case 3 in the axial direction J and in the circumferential direction E is restricted in a state where the engagement projection M is engaged with the engagement hole N. The engagement recess having a hollowed outer peripheral surface 17A may be provided in the cylindrical body 17 of the lower case 3, so as to be engaged with the engagement projection M.

It is merely required that at least a pair of the engagement projection M and the engagement hole N, or a pair of the engagement projection M and the engagement recess, which are described above, is provided in the circumferential direction.

The above description for the embodiments is all examples, and thus the present invention is not limited thereto. Various improvements and modifications can be applied without departing from the scope of the present invention.

What is claimed is:

1. A strut bearing device comprising:
   a strut bearing; and
   an upper spring seat that is a spring support component supporting an upper end of a coil spring, wherein
   the strut bearing includes:
   an upper case and a lower case;
   an upper raceway ring held by the upper case;
   a lower raceway ring held by the lower case; and
   a rolling element that rolls between the upper raceway ring and the lower raceway ring,
   the upper case and the lower case are made of a synthetic resin,
   the upper spring seat is made of steel,
   the upper spring seat has a cylindrical part and a disc part,
   the cylindrical part has, at an upper part thereof, one of at least one engagement hole penetrated in a radial direction and at least one engagement recess having a hollowed inner peripheral surface,
   the lower case has a cylindrical member fitted along an inner peripheral surface of the upper part of the cylindrical part,
   the cylindrical member has, at an outer peripheral surface thereof, at least one engagement projection engaged with the at least one engagement hole or the at least one engagement recess,
   each of the at least one engagement hole or the at least one engagement recess is provided at a location along a less than entire portion along a circumferential direction about the upper part of the cylindrical part of the upper spring seat,
   each of the at least one engagement projection is provided at a location along a less than entire portion along a circumferential direction about the outer peripheral surface of the cylindrical member, relative movement of the upper spring seat and the lower case in an axial direction is restricted in a state where the at least one engagement projection is engaged with the at least one engagement hole or the at least one engagement recess, and the upper spring seat and the lower case are prevented from slidably moving in the circumferential direction by a structure in which the at least one engagement projection is engaged with the at least one engagement hole or the at least one engagement recess.

2. The strut bearing device according to claim 1, wherein the at least one engagement projection of the lower case has a top face that is a substantially horizontal surface or a side face of a column extending in a substantially horizontal direction, and the at least one engagement projection has a bottom face that is an inclined face reducing a diameter thereof as approaching a lower side.

3. A strut bearing device comprising:

a strut bearing; and an upper spring seat that is a spring support component supporting an upper end of a coil spring, wherein the strut bearing includes:
 an upper case and a lower case;
 an upper raceway ring held by the upper case;
 a lower raceway ring held by the lower case; and
 a rolling element that rolls between the upper raceway ring and the lower raceway ring, the upper case and the lower case are made of a synthetic resin, the upper spring seat is made of steel, the upper spring seat has a cylindrical part and a disc part, and the cylindrical part has, at an upper part thereof, at least one engagement projection that projects in a radially inward direction, the lower case has a cylindrical member fitted along an inner peripheral surface of the upper part of the cylindrical part, the cylindrical member has one of at least one engagement hole penetrated in a radial direction and at least one engagement recess that has a hollowed outer peripheral surface, the at least one engagement hole or the at least one engagement recess being engaged with the at least one engagement projection, each of the at least one engagement hole or the at least one engagement recess is provided at a location along a less than entire portion along a circumferential direction about the upper part of the cylindrical part of the upper spring seat, each of the at least one engagement projection is provided at a location along a less than entire portion along a circumferential direction about the outer peripheral surface of the cylindrical member, relative movement of the upper spring seat and the lower case in an axial direction at least one engagement recess is restricted in a state where the at least one engagement hole or is engaged with the at least one engagement projection, and the upper spring seat and the lower case are prevented from slidably moving in the circumferential direction by a structure in which the at least one engagement projection is engaged with the at least one engagement hole or the at least one engagement recess.

4. A vehicle strut suspension comprising the strut bearing device according to claim 1.

* * * * *